(12) United States Patent
Suzuki

(10) Patent No.: US 6,930,467 B2
(45) Date of Patent: Aug. 16, 2005

(54) MULTI-SERIES CONNECTION TYPE BATTERY CELL PACK FOR REDUCING SELF-CONSUMPTION OVER A LONG PERIOD OF TIME

(75) Inventor: Shin Suzuki, Utsunomiya (JP)

(73) Assignee: NEC Tokin Tochigi, Ltd., Utsunomiya (JP)

( * ) Notice: Subject to any disclaimer, the term of this patent is extended or adjusted under 35 U.S.C. 154(b) by 323 days.

(21) Appl. No.: 10/300,588

(22) Filed: Nov. 21, 2002

(65) Prior Publication Data

US 2004/0101744 A1 May 27, 2004

(51) Int. Cl.[7] .............................................. H01M 10/46
(52) U.S. Cl. .................................................... 320/134
(58) Field of Search ............................... 320/116, 118, 320/119, 134, 136

(56) References Cited

U.S. PATENT DOCUMENTS

| | | | |
|---|---|---|---|
| 4,998,057 A | 3/1991 | Shinohara et al. | 320/40 |
| 5,485,073 A | 1/1996 | Kasashima et al. | 320/15 |
| 5,641,587 A | 6/1997 | Mitchell et al. | 429/90 |
| 5,789,900 A | 8/1998 | Hasegawa et al. | 320/132 |
| 5,990,665 A | 11/1999 | Kawata et al. | 320/162 |
| 6,043,627 A | 3/2000 | Doura et al. | 320/116 |
| 6,144,186 A | 11/2000 | Thandiwe et al. | 320/134 |

FOREIGN PATENT DOCUMENTS

| | | |
|---|---|---|
| EP | 0 880 214 | 11/1998 |
| JP | 8-322157 | 12/1996 |
| JP | 9-074689 | 3/1997 |
| JP | 9-289041 | 11/1997 |
| JP | 10-304586 | 11/1998 |
| JP | 2000-354335 | 12/2000 |

OTHER PUBLICATIONS

Communication dated Jan. 14, 2004 with European Search Report.

Primary Examiner—Edward H. Tso
(74) Attorney, Agent, or Firm—Westerman, Hattori, Daniels & Adrian, LLP

(57) ABSTRACT

The invention provides a multi-series connection type battery cell pack, characterized by comprising a plurality of series-connected battery cells 1, a charge/discharge control switch 2 for performing charge/discharge control, a plurality of protective circuits 3-1 and 3-2 for dividing the plurality of battery cells 1 into a plurality of blocks to detect at least the voltage of each battery cell, a computing circuit 5 for performing computation of pack detection signals and a level conversion circuit 4 for unifying voltages references of the detection signals between the plurality of protective circuits 3-1 and 3-2 and the computing circuit 5, wherein the plurality of protective circuits 3-1 and 3-2 are joined in parallel with the battery cells 1 in a multistage fashion. It is thus possible to unify the voltage references while computation and communication are executed irrespective of control. It is then possible to manage the battery cell pack in a unified manner using a microcomputer or the like and, hence, to determine management specific to batteries and operational criteria specific to battery products at users' disposal. It is also possible to make a switching between a mode wherein current consumption in the pack minimizes and a normal operation mode and, hence, switch the pack over to the minimum current consumption mode when it is not in use, thereby reducing the failure rate during long-term storage.

9 Claims, 4 Drawing Sheets

MULTI-SERIES CONNECTION TYPE BATTERY CELL PACK FOR REDUCING SELF-CONSUMPTION OVER A LONG PERIOD OF TIME

BACKGROUND OF THE INVENTION

The present invention relates to a multi-series connection type battery cell pack that comprises a plurality of series-connected battery cells, a charge/discharge control switch connected between said plurality of battery cells and an output terminal for performing charge/discharge control, a plurality of protective circuits for detecting at least the voltage of each battery cell, and a control circuit for communication with a computing circuit for performing computation of pack detection signals including each detection signal from said plurality of protective circuits and external equipments, thereby performing management and control of signals in the pack including said detection signals. The present invention is also directed to a charger making use of a battery cell pack function to charge a battery cell pack comprising therein a detection circuit for detecting at least the voltages and charging currents of said plurality of battery cells and a control circuit that has a function of communicating with external equipment and converting said detection signals to digital data for management and control purposes.

So far, portable electronic equipments such as cellular phones, notebook personal computers, players and digital cameras have been operated using as power sources a battery cell pack comprising therein a plurality of series-connected rechargeable battery cells, e.g., lithium ion battery cells. For these equipments that do not need any extremely high source voltages, a series connected type battery cell pack comprising four battery cells at most suffices. However, when such a type battery cell pack is intended for use as a power source for electrically aided bicycles that are now enjoying a growing popularity, for instance, a multi-series connection type battery cell pack comprising at least 7 battery cells is needed because the voltage of the four-battery cell pack is unacceptably low.

FIG. 1 is a diagram showing a prior art battery cell pack and how to perform charge control with a charger. Reference numeral 10 is a battery cell pack, 11 cells, 12 a charge/discharge control switch, 13 a protective circuit, 20 a charger, 21 a charging unit, 22 a charge detection unit, 23 a charging power source, and Ri and R1 current detection resistances.

The conventional battery cell pack, and how to perform charge control with a charger is now summarily explained. In addition to the cells 11, the battery cell pack 10 has usually therein the charge/discharge control switch 12 that is series-connected between input/output terminals, the current detection resistance Ri for detection of discharging currents, and the protective circuit 13 for detecting cell voltages and discharging currents, thereby protecting the battery cells against overcharging and over-discharging, as shown in FIG. 1. The charger 20 for charging the cells 11 connected to the battery cell pack 10 is provided with the current detection resistance R1 for detection of charging currents for the battery cell pack 10, the charge detection unit 22 for detection of the charging voltage and current of the battery cell pack 10, and the charging unit 21 for performing control of the charging voltage and current fed from the charging power source 23 to the battery cell pack 10 and control of when to stop charging on the basis of the charging voltage and current detected by the charging detection unit 22.

As explained above, in the battery cell pack 10 there are provided the charge/discharge control switch 12 series-connected between the cells 11 and the input/output terminals and comprising a charge control FET and a discharge control FET, and the protective circuit 13 for controlling a control microcomputer for communicating with outside to manage and control the battery cell pack and detecting the voltages and currents of the cells to control the charge control FET and discharge control FET. For this protective circuit, however, only low-voltage or medium-voltage protective ICs compatible with battery cell packs comprising four cells at most are commercialized because the standard type set for conventional battery cell packs like the battery cell pack 10 is still made up of up to 4 series-connected cells.

In new applications where battery cell packs whose voltage is higher than ever before are needed, as is the case with power sources for the aforesaid electrically aided bicycles, the low- or medium-voltage protective ICs must be connected together in a "protective ICS" unit. On the other hand, a problem with the control microcomputer is that when signals from the respective low- or medium-voltage protective ICs are processed, some inconveniences are caused during computations or communications unless the processing levels are appropriate to the varying voltage references of the low- or medium-voltage protective ICs.

In such applications where a plurality of low- or medium-voltage protective ICs are used, internal power consumptions increase. This in turn leads to another problem that pack storability becomes drastically worse or some packs are susceptible to over-discharging while they are let stand.

For a charger for charging a battery cell pack, on the other hand, a close understanding of the charging voltage and current of the battery cell pack is an important factor in consideration of charging accuracy as well as evaluation of to what degree the battery cell pack deteriorates. For a conventional charger, a high-precision A/D converter or the like must thus be used on a charging unit to detect charging currents, resulting in a complicated, large, expensive circuit. Especially in the case of such a multi-series connection type as set forth above, it is important to have an understanding of the degree of deterioration of each cell in the battery cell pack; in the conventional charger, however, it is impossible to keep track of the degree of deterioration of each cell.

SUMMARY OF THE INVENTION

One object of the present invention is to enable level conversion processing to be easily performed when a plurality of detection, protective circuits are used while they are connected each other. Another object of the present invention is to make it possible to reduce self-consumption in a battery cell pack over a long period of time. Yet another object of the present invention is to make it possible to have through a charger a precise understanding of what degree each cell in a battery cell pack is charged to and to improve the charger in terms of ease of operation, size, and reliability.

According to the present invention, these objects are achievable by the provision of a multi-series connection type battery cell pack, characterized by comprising a plurality of series-connected battery cells, a charge/discharge control switch connected between said plurality of battery cells and an output terminal to perform charge/discharge control, a plurality of protective circuits for dividing said plurality of battery cells into a plurality of blocks to detect at least the voltage of each battery cell, a computing circuit for computation of pack detection signals including detection signals of said plurality of protective circuits and a level conversion circuit for unifying voltages references of said detection signals between said plurality of protective circuits and said computing circuit, wherein said plurality of protective circuits are joined in parallel with said battery cells in a multistage fashion.

In one specific embodiment of this aspect of the present invention, the computing circuit is characterized by having a function capable of communicating with external equipment, wherein a charge/discharge control signal is sent out to the uppermost-stage protective circuit of said plurality of protective circuits on the basis of an order from said external equipment or computation of said pack detection signals, so that said uppermost-stage protective circuit controls said charge/discharge control switch, one of said plurality of protective circuits includes as detection signals a detection signal for charging/discharging currents which is detected by a voltage across a current detection resistance connected between said plurality of battery cells and said output terminal, and said pack detection signal includes a temperature detection signal detected by a temperature detection thermistor located in a pack.

Another multi-series connection type battery cell pack of the present invention is characterized by comprising a plurality of series-connected battery cells, a charge/discharge control switch connected between said plurality of battery cells and an output terminal to perform charge/discharge control, a protective circuit for detecting at least the voltage of each of said plurality of battery cells and a control circuit for communicating with external equipment to manage and control signals in said pack, inclusive of detection signals, wherein said control circuit has a switching function of making a switching between a mode wherein current consumption in said pack minimizes and a normal operation mode.

In one specific embodiment of this aspect of the present invention, said protective circuit comprises a plurality of protective circuits for dividing said plurality of batteries into a plurality of blocks to detect at least the voltages of the respective battery cells and between said protective circuit and said control circuit there is positioned a level conversion circuit to unify the voltage references of detection signals, wherein said plurality of protective circuits are joined in parallel with said battery cells in a multistage manner.

The present invention also provides a charger that makes use of a battery cell pack function of charging a battery cell pack comprising therein a plurality of series-connected battery cells, a detection circuit for detecting at least the voltages and charging currents of said plurality of battery cells and a control circuit having a communication function capable of communicating with external equipment and for managing and controlling detection signals, which comprises a charging unit for charging said battery cell pack from a charging power source and a charge control means for communicating with said control circuit in said battery cell pack to acquire and compute said detection signals thereby controlling said charging unit, wherein said detection signals acquired at said charge control means are digital data converted at said control circuit in said battery cell pack.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF PREFERRED EMBODIMENTS

Figure 1:
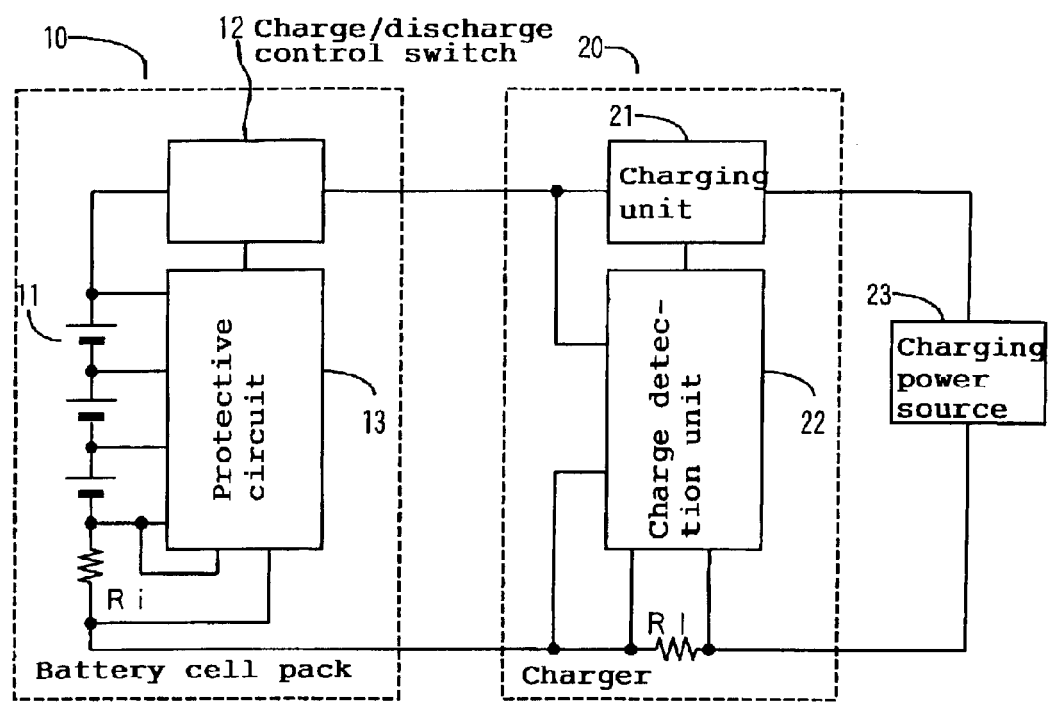
FIG. 1 is illustrative of a conventional battery cell pack and how to control charging with a conventional charger.

Some embodiments of the present invention are now explained with reference to the accompanying drawings. One embodiment of the multi-series connection type battery cell pack according to the present invention is shown in FIG. 2, wherein reference numeral 1 is a battery, 2 a charge/discharge control switch, 3-1 a detection circuit, 3-2 a detection circuit, 4 a level conversion circuit, and 5 a control microcomputer.

Figure 2:
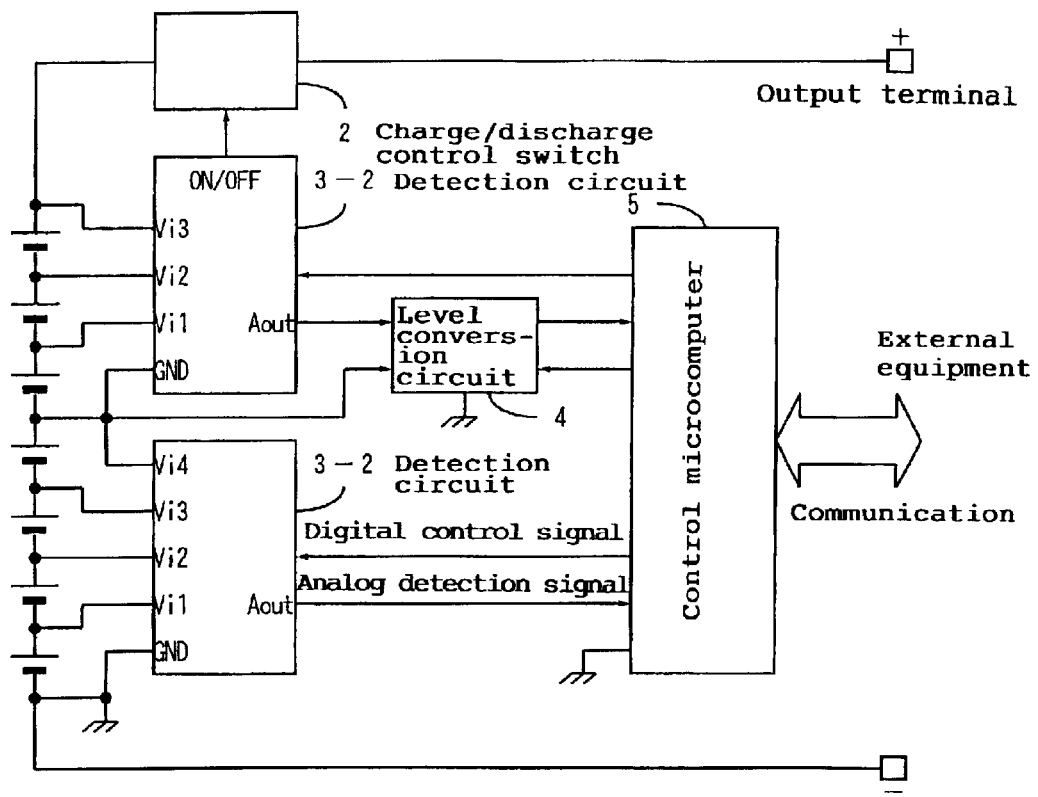
FIG. 2 is illustrative of one embodiment of the multi-series connection type battery cell pack according to the present invention.

In FIG. 2, the battery 1 is an assembly of, for instance, seven battery cells that are series-connected to produce the desired voltage, and the charge/discharge control switch 2 is inserted in series between the battery 1 and an output terminal for performing charge/discharge control. The detection circuit 3-1 is connected in parallel with cells at the first to fourth stages of the battery 1 to detect the voltages of the cells, and the detection circuit 3-2 is a combined detective and protective means using a commercially available protective IC as an example, which means is connected in parallel with three cells at the fifth to seventh stages to detect the voltages of the cells and perform the on-off operation of the charge/discharge control switch 2. The detection circuits 3-1 and 3-2 are placed under control and management of the control microcomputer 5, and serve to transfer the cell voltages and discharging currents as analog detection signals (Aout) on a request from the control microcomputer 5. In the present disclosure, the "circuit", "means" and "IC" are thought of as being conceptually equivalent to one another.

While the detection circuit 3-2 is joined to the upper stage of the detection circuit 3-1, the level conversion circuit 4 performs level conversion for unifying voltage references for detection data (Aout) from the detection circuit 3-1, which are transferred to the control microcomputer 5. When the detection circuits 3-1 and 3-2, each comprising a low- or medium-voltage protective IC, are used for high-voltage protection while they are joined together as shown, it is preferable to perform level conversion processing at the level conversion circuit 4, because it is possible to unify the voltage references for the purpose of executing computation and communication regardless of control.

The control microcomputer 5 is a computing means for communicating with external equipment via control signals and data, controlling the detection circuits 3-1 and 3-2 and level conversion circuit 4 through a digital control line, and collecting successively analog detection signals from the detection circuits 3-1 and 3-2, thereby computing pack detection signals inclusive of these detection signals.

On the basis of computation of control commands from external equipment and pack detection signals, the control microcomputer 5 sends an on-off control signal for the charge/discharge control switch 2 to the detection circuit 3-2. In response to this, the detection circuit 3-2 controls the on-off operation of the charge/discharge control switch 2.

Further, the control microcomputer 5 manages as a single unit a plurality of circuits (device ICs) in the pack such as detection circuits 3-1 and 3-2 and level conversion circuit 4, so that when they are not used or not in operation, they can be switched over to an operation mode where current consumption minimizes. This in turn makes it possible to reduce current consumption to the necessary minimum level thereby preventing deep discharge while battery cell packs are not used or stocked by makers or stored by users as spares. Furthermore, on the basis of control commands from external equipments or computation of pack detection signals, the control microcomputer 5 sends on-off control signals for the charge/discharge control switch 2 to the detection circuit 3-2. In response to this, the detection circuit 3-2 controls the on-off operation of the charge/discharge control switch 2.

According to the present invention, when information about conventionally joined battery cells is detected by detection circuits and devices, detection circuits and devices corresponding to the detectable number of series-connected battery cells are connected and inserted together to convert to the pack voltage reference information about the devices, including detection signals for the voltages of the series-connected cells, so that such information can be batch processed by a processing device. It is thus possible to use as the processing device a microcomputer that can be built depending on users' specific conditions, and perform settings and controls specific to battery cells and pack products. Therefore, even when self-consumption in the pack increases as the number of circuits and devices built therein increases depending on voltage, it is possible to select only the necessary circuits and devices depending on what conditions the pack is used in, and determine the operations of the circuits and devices, so that the operations and current consumptions thereby can be reduced down to the necessary minimum level. For instance, the pack can be so stored intact over an extended period of time that deep discharge breakdowns (deterioration) during storage can be minimized.

Figure 3:
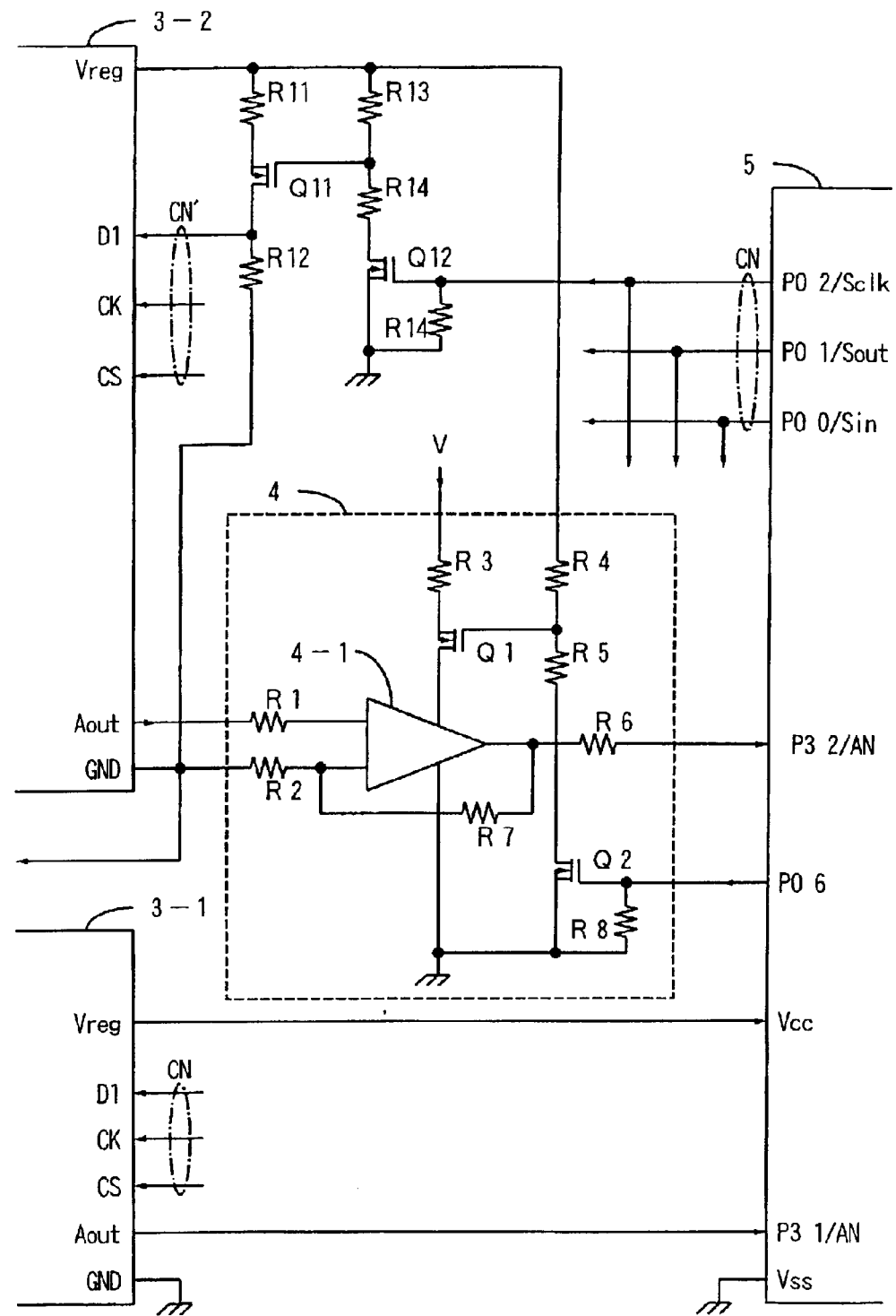
FIG. 3 is illustrative of one specific construction of the level conversion circuit in the multi-series connection type battery cell pack according to the present invention.

One specific construction of the level conversion circuit in the multi-series connection type battery cell pack according to the present invention is now explained. FIG. 3 is illustrative of the specific construction of the multi-series connection type battery cell pack according to the present invention. Reference numeral 4-1 is an operational amplifier, Q1, Q2, Q3 and Q4 are control transistors, R1 to R8 and R11 to R14 are resistances, and CN is a digital signal line.

In FIG. 3, detection circuits 3-1 and 3-2 each comprise a similar protective IC as shown in FIG. 2 (for instance, IC: M61040FP manufactured by Mitsubishi Electric Corporation). Vreg stands for a regulating power terminal, D1, CK and CS are input terminals for digital control signals CN and CN', and Aout is an output terminal for an analog detection signal. A control microcomputer 5 comprises a similar control IC as in the control microcomputer of FIG. 2 (e.g., IC: M38503MXH manufactured by Mitsubishi Electric Corporation), and Vcc represents a bias power terminal, P0 2/Sclk, P0 1/Sout and P0 0/Sin indicate output terminals for digital control signals, P3 1/AN and P3 2/AN mean input terminals for analog detection signals, and P0 6 stands for a control terminal for a level conversion circuit.

A level conversion circuit 4 is made up of an operational amplifier 4-1 (e.g., IC: uPC1251G2 manufactured by NEC), control transistors Q1 and Q2 and resistances R1 to R8, and operates to unify voltage references (GND) of analog detection signals sent out of the output terminal Aout of the detection circuit 3-1 and analog detection signals sent out of the output terminal Aout of the detection circuit 3-2 to the control microcomputer 5.

The operational amplifier 4-1 operates to compute analog detection signals sent out of the output terminal Aout of the detection circuit 3-2 on a reference terminal (GND) voltage basis, and perform level conversion in such a way that analog detection signals entered in the input terminal P3 2/AN of the control computer 5 are on the same voltage reference (GND) level as analog detection signals entered in the input terminal P3 1/AN of the control microcomputer 5.

The control transistors Q1 and Q2 are to control the operation of the level conversion circuit 4. The on-off operation of the control transistor Q2 is controlled through the control microcomputer 5, so that the control transistor Q1 is put on or off. To reduce as much energy consumption in the battery cell pack as possible, the level conversion circuit 4 is placed in operation only when required, so that during other periods the control transistor Q1 is held off to reduce useless energy consumption.

Referring to power-conservation control and control of the detection circuits 3-1 and 3-2 by the control microcomputer 5, the control microcomputer 5 sends the digital control signals CN out of its output terminals P0 2/Sclk, P0 1/Sout and P0 0/Sin to set specific information and operating conditions, so that the detection circuits 3-1 and 3-2 are controlled to selectively send detection signals and execute the on-off operation of the charge/discharge control switch, as already explained. By performing on-off control of the control transistor Q2 in the level conversion circuit 4 by means of the output terminal P0 6, the on-off operation of the control transistor Q1 is controlled to control the operation of the level conversion circuit 4. These controls enable the battery cell pack to be placed in a minimum current consumption state (sleep mode) where, for instance, the power sources in the detection circuits 3-1 and 3-2 are held off and the control transistor Q1 in the level conversion circuit 4 is switched off, so that the necessary minimum operation is feasible on the necessary minimum current.

The detection circuit 3-1 is on the lowermost stage; the digital control signals CN are entered directly in the input terminals D1, DK and CS, so that the cell voltages detected from the output terminal Aout on demand are sent out in the form of analog detection signals. On the other hand, the detection circuit 3-2 is joined to the upper stage of the detection signal 3-1; digital control signals CN' are entered in the input terminals D1, CK and CS via a signal conversion circuit made up of control transistors Q11–Q12 and resistances R11–R14, so that the cell voltages detected from the output terminal Aout on demand are likewise sent out in the form of analog detection signals.

It is here noted that only one signal conversion circuit built up of control transistors Q11–Q12 and resistances R11–R14 is shown between the output terminal P0 2/Sclk of the control microcomputer 5 and the input terminal D1 of the detection circuit 3-2. Although not shown, similar circuits are interposed between the output terminal P0 1/Sout of the control microcomputer 5 and the input terminal CK of the detection circuit 3-2 and between the output terminal P 1/Sin of the microcomputer 5 and the input terminal CS of the detection circuit 3-2.

Figure 4:
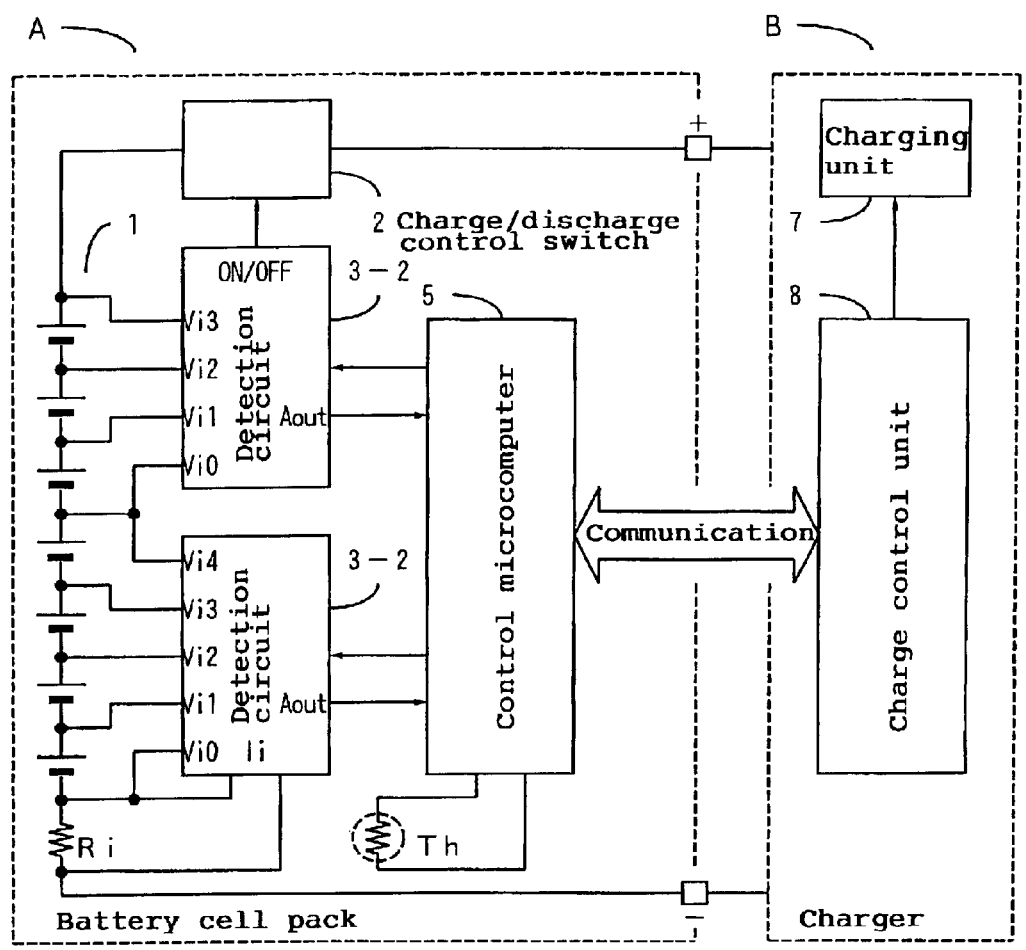
FIG. 4 is illustrative of one embodiment of the charger making use of the battery cell pack function according to the present invention.

FIG. 4 is illustrative of one embodiment of the charger that makes use of the battery cell pack function according to the present invention. Reference numeral 7 stands for a charging unit, 8 a charge control unit, A a battery cell pack, B a charger, Ri a current detection resistance and Th a thermistor.

In FIG. 4, the charger B comprises the charge control unit 8 that communicates with the battery cell pack A to acquire detection data such as the voltages, charging currents, temperatures, etc. of battery cells in the battery cell pack A, thereby computing the charging voltage that amounts to the sum of the voltages of the cells, judging what state the cells are charged in, and performing other predetermined computations, and the charging unit 7 that, on the basis of the results of computations at the charge control unit 8, performs control of charging voltage and current supplied from a charging power source to the battery cell pack A as well as of control of when charging is to be stopped. Accordingly, the charger B does not include circuits such as current detection resistance for direct detection of charging voltage and currents and an A/D converter. In other words, the charger B is designed to acquire data that are detected in the battery cell pack for the purpose of protecting overcharging, over-charging and overheating by means of communication, so that the data are processed to obtain information that is used for charge control.

The battery cell pack A is a battery cell pack as explained with reference to FIGS. 2 and 3. This battery cell pack comprises therein a charge/discharge control switch 2, detection circuits 3-1 and 3-2, a control microcomputer 5, etc. The detection circuit 3-1 is connected in parallel with cells at the first to fourth stages of a battery 1 to detect the voltages of the cells and to detect charge/discharge currents from a voltage across a current detection resistance Ri. The control microcomputer 5 communicates with external equipment via control signals and data to control the detection circuits 3-1 and 3-2 through a digital control line, so that analog detection signals are successively collected from the detection circuits 3-1 and 3-2, and pack detection signals including these detection signals and temperature detection signals are converted to digital detection signals for computing operation. The thermistor Th is located in the vicinity of the battery 1 to detect temperatures.

In the battery cell pack, information about voltage, current, temperature, etc. is used to control the charge/discharge control switch for protection purposes. According to the present invention, however, these data are acquired from the charger side via communication, whereby conventional high-precision A/D converters, voltage/current detection circuits, etc. built in the charger can be dispensed with. In addition, individual detection data on the battery cell pack can be used as such; the degree of deterioration of the cells and variations in that degree can be so judged that charge control can be performed with higher precision than achieved so far by detection of charging voltage and current on the charger side. In short, depending on the degree of deterioration of individual cells and variations in that degree, which cannot be controlled on a conventional charger, charging voltage and current can be controlled to judge whether or not full-charge is achieved.

It is here understood that the present invention is not limited to the aforesaid embodiments, and so various modifications may be made without departing from the scope disclosed herein. For instance, while the aforesaid embodiments have been described with reference to an arrangement wherein two detection circuits (devices) are joined together, it is understood that they are equally applicable to arrangements wherein three or more detection circuits are joined together.

While the detection and protective circuits have been described with reference to a series-connected four-cell arrangement, it is appreciated that the present invention may be applied to any desired number of series-connected cells. At the lowermost-stage detection circuit, it is acceptable to detect charging/discharging currents from a voltage across the current detection resistance connected in series with the battery cells. It is also acceptable that the control microcomputer is designed just only to perform computation of cell voltages and charge/discharge currents detected from the respective detection circuits, but also to perform computation of temperatures detected by a thermistor located in the pack, etc.

In the battery cell pack of the present invention, the on-off operation of the charge/discharge control switch is carried out by the upper-stage detection circuit on the basis of control signals from the control microcomputer. However, it is acceptable to perform the direct on-off operation of the charge/discharge control switch from the control microcomputer.

As can be seen from the foregoing, the present invention provides a multi-series connection type battery cell pack, characterized by comprising a plurality of series-connected battery cells, a charge/discharge control switch connected between said plurality of battery cells and an output terminal to perform charge/discharge control, a plurality of protective circuits for dividing said plurality of battery cells into a plurality of blocks to detect at least the voltage of each battery cell, a computing circuit for computation of pack detection signals including detection signals of said plurality of protective circuits and a level conversion circuit for unifying voltages references of said detection signals between said plurality of protective circuits and said computing circuit, wherein said plurality of protective circuits are joined in parallel with said battery cells in a multistage fashion. It is thus possible to unify the voltage references while computation and communication are executed irrespective of control. It is then possible to manage the battery cell pack in a unified manner using a device capable of performing processing and management specific to users, e.g., a microcomputer and, hence, to determine management specific to batteries and operational criteria specific to battery products at users' disposal.

According to the present invention, in principle, no limitation is imposed on the number of series-connected cells; that is, an infinite number of series-connected cells may be controlled and managed by means of one single processing device (e.g., a microcomputer). Upon data, etc. entered into the detection and protective circuits, device breakdowns by voltage can be minimized because detection and processing can be performed within the voltage range of the device.

Further, the present invention provides a multi-series connected type battery cell pack, comprising a plurality of series-connected battery cells, a charge/discharge control switch connected between said plurality of battery cells and an output terminal to perform charge/discharge control, a protective circuit for detecting at least the voltage of each of said plurality of battery cells and a control circuit for communicating with external equipment to manage and control signals in said pack, inclusive of detection signals, wherein said control circuit has a switching function of making a switching between a mode wherein current consumption in said pack minimizes and a normal operation mode. It is thus possible to switch the battery cell pack over to the minimum current consumption mode when it is not in use, so that the failure rate upon long-term storage can be held back.

In the battery cell pack of the present invention, the aforesaid protective circuit comprises a plurality of protective circuits for dividing said plurality of batteries into a plurality of blocks to detect at least the voltages of the respective battery cells and between said protective circuit and said control circuit there is positioned a level conversion circuit to unify the voltage references of detection signals, wherein said plurality of protective circuits are joined in parallel with said battery cells in a multistage manner. It is thus possible to manage a plurality of circuits and devices in a unified manner using a microcomputer enabling control and management specific to users and, hence, free up to perform a switchover to the minimum current consumption mode (sleep mode), which has so far been effected upon a voltage drop. This can in turn make the deep discharge time of battery cell packs stocked by makers or stored by users as spares so long that the failure rate upon long-term storage can be reduced.

The present invention also provides a charger that makes use of a battery cell pack function of charging a battery cell pack comprising therein a plurality of series-connected battery cells, a detection circuit for detecting at least the voltages and charging currents of said plurality of battery cells and a control circuit having a communication function capable of communicating with external equipment and for managing and controlling detection signals, which comprises a charging unit for charging said battery cell pack from a charging power source and a charge control means for communicating with said control circuit in said battery cell pack to acquire and compute said detection signals thereby controlling said charging unit. It is thus possible to dispense with circuits such as circuits for detection of charging voltages and currents and A/D converters, which have so far been built in a charger.

For the charger of the present invention, it is only needed to have a minimum function as a dedicated charger, and so the circuit can be simplified and downsized with increased reliability. In addition, by processing information detected on the individual cells in the battery cell pack, it is possible to have a more precise understanding of the charging state of the pack, and so achieve an inexpensive yet high-function charger capable of charging depending on the charging state.

For a conventional standard type battery cell pack comprising up to series-connected four battery cells, only low- or medium-voltage protective ICs available for up to four series connections have been commercialized. In new applications where battery cell packs having voltages higher than ever before are needed as is the case with a power source used with the aforesaid electrically aided bicycle, such protective ICs must be joined together in a four-series connection unit. Even for such a battery cell pack, the present invention can provide a dedicated charger having a minimum function and high reliability because it can make immediate use of information on the individual cells in the pack.

I claim:

1. A multi-series connection type battery cell pack, characterized by comprising a plurality of series-connected battery cells, a charge/discharge control switch connected between said plurality of battery cells and an output terminal to perform charge/discharge control, a plurality of protective circuits for dividing said plurality of battery cells into a plurality of blocks to detect at least the voltage of each battery cell, a computing circuit for computation of pack detection signals including detection signals of said plurality of protective circuits and a level conversion circuit for unifying voltages references of said detection signals between said plurality of protective circuits and said computing circuit, wherein said plurality of protective circuits are joined in parallel with said battery cells in a multistage fashion.

2. The multi-series connection type battery cell pack according to claim 1, characterized in that said computing circuit has a function capable of communicating with external equipment, wherein a charge/discharge control signal is sent out to the uppermost-stage protective circuit of said plurality of protective circuits on the basis of an order from said external equipment or computation of said pack detection signals, so that said uppermost-stage protective circuit controls said charge/discharge control switch.

3. The multi-series connection type battery cell pack according to claim 1, characterized in that one of said plurality of protective circuits includes as detection signals a detection signal for charging/discharging currents which is detected by a voltage across a current detection resistance connected between said plurality of battery cells and said output terminal.

4. The multi-series connection type battery cell pack according to claim 1, characterized in that said pack detection signal includes a temperature detection signal detected by a temperature detection thermistor located in a pack.

5. A multi-series connection type battery cell pack, characterized by comprising a plurality of series-connected battery cells, a charge/discharge control switch connected between said plurality of battery cells and an output terminal to perform charge/discharge control, a protective circuit for detecting at least the voltage of each of said plurality of battery cells and a control circuit for communicating with external equipment to manage and control signals in said pack, inclusive of detection signals, wherein said control circuit has a switching function of making a switching between a mode wherein current consumption in said pack minimizes and a normal operation mode.

6. The multi-series connection type battery cell pack according to claim 5, characterized in that said protective circuit comprises a plurality of protective circuits for dividing said plurality of batteries into a plurality of blocks to detect at least the voltages of the respective battery cells.

7. The multi-series connection type battery cell pack according to claim 5, characterized in that between said protective circuit and said control circuit there is positioned a level conversion circuit to unify voltage references of detection signals, wherein said plurality of protective circuits are joined in parallel with said battery cells in a multistage manner.

8. A charger that makes use of a battery cell pack function, characterized by comprising therein a plurality of series-connected battery cells, a detection circuit for detecting at least the voltages and charging currents of said plurality of battery cells and a control circuit having a communication function capable of communicating with external equipment and for managing and controlling detection signals, which comprises a charging unit for charging said battery cell pack from a charging power source and a charge control means for communicating with said control circuit in said battery cell pack to acquire and compute said detection signals thereby controlling said charging unit.

9. The charger that makes use of a battery cell pack function according to claim 8, characterized in that said detection signals acquired at said charge control means are digital data converted at said control circuit of said battery cell pack.

* * * * *